United States Patent
Gabiniewicz et al.

(10) Patent No.: US 6,907,360 B2
(45) Date of Patent: Jun. 14, 2005

(54) CLOSURE MEASURING SYSTEM

(75) Inventors: Joseph V. Gabiniewicz, Northville, MI (US); Guenther Braeuner, Farmington Hills, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/399,060

(22) PCT Filed: Oct. 10, 2001

(86) PCT No.: PCT/US01/42652

§ 371 (c)(1),
(2), (4) Date: Sep. 17, 2003

(87) PCT Pub. No.: WO02/31435

PCT Pub. Date: Apr. 18, 2002

(65) Prior Publication Data

US 2004/0054496 A1 Mar. 18, 2004

Related U.S. Application Data

(60) Provisional application No. 60/239,554, filed on Oct. 10, 2000.

(51) Int. Cl.⁷ .............................................. G06F 15/00
(52) U.S. Cl. .............................. 702/41; 702/102; 701/3; 701/35; 701/45
(58) Field of Search ........................... 702/29, 41, 102; 701/3, 35, 45

(56) References Cited

U.S. PATENT DOCUMENTS

| | | | |
|---|---|---|---|
| 4,736,515 A | 4/1988 | Catena | |
| 5,299,508 A | * 4/1994 | Connelly | 105/241.2 |
| 5,317,460 A | * 5/1994 | Kim | 360/73.05 |
| 5,627,767 A | * 5/1997 | Gabiniewicz et al. | 702/41 |
| 5,806,020 A | * 9/1998 | Zykan | 702/159 |
| 5,936,167 A | 8/1999 | Kulig et al. | 73/865.6 |
| 5,966,801 A | 10/1999 | Wu et al. | 29/701 |
| 6,062,079 A | 5/2000 | Stewart | 73/865.9 |
| 6,079,286 A | 6/2000 | Struble | 73/866.5 |
| 6,189,394 B1 | 2/2001 | Sullivan et al. | 73/865.9 |

\* cited by examiner

*Primary Examiner*—Kamini Shah
(74) *Attorney, Agent, or Firm*—Clark Hill PLC

(57) ABSTRACT

A closure measuring system for measuring operable specifications of a door panel of an automotive vehicle. The closure measuring system includes a data sensing device adapted to be removably attached to the door panel on the vehicle for sensing and measuring a plurality of operable specifications of the door panel; such as the velocity, energy to move the door and closed door flushness. A control panel is provided for calculating and displaying the sensed and measured operable specifications from the data sensing device and comparing the sensed and measured operable specifications to predetermined design specifications of the door panel. A data acquisition chassis is electrically coupled between the data sensing device and the control panel for storing and transmitting the operable specifications between the data sensing device and the control panel.

4 Claims, 2 Drawing Sheets

CLOSURE MEASURING SYSTEM

This application claims the benefit of the Provisional Application No. 60/239,554 filed Oct. 10, 2000.

BACKGROUND OF THE INVENTION

1. Field of Invention

The present invention relates to a closure measuring system, and more particularly, to a closure measuring system for measuring the tolerances and efforts for closing a movable member of an automotive vehicle.

2. Background of Invention

Automotive vehicles are equipped with numerous movable components. Such movable components are design with particular tolerances and desired efforts for function and fit. For example, a door of an automotive vehicle is typically pivotally coupled to the body of the vehicle for pivotal movement between an open position providing access through a door opening in the vehicle and a closed position closing the door opening. The door is designed to meet certain predetermined efforts or forces required by the operator to pivot the door between the open and closed positions. Additionally, the door is designed to meet certain predetermined tolerances or alignment requirements with the body of the vehicle when in the closed position.

Traditionally, these efforts and tolerance have been manually measured by the designer, engineer or manufacturer without the aid and benefit of a computerized feedback type system for providing fast and accurate measurements.

Therefore, it is desirable to provide a closure measuring system for automatically measuring the efforts, tolerances and other desired design specifications of the movable member of the vehicle.

SUMMARY OF THE INVENTION

The present invention includes a closure measuring system for measuring operable specifications of a movable member of an automotive vehicle. The closure measuring system includes a data sensing device adapted to be removably attached to the movable member on the vehicle for sensing and measuring at least one of a plurality of operable specifications of the movable member, a control panel for calculating and displaying the sensed and measured operable specifications from the data sensing device and comparing the sensed and measured operable specifications to predetermined design specifications of the member, and a data acquisition chassis coupled between the data sensing device and the control panel for storing and transmitting the operable specifications between the data sensing device and the control panel.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
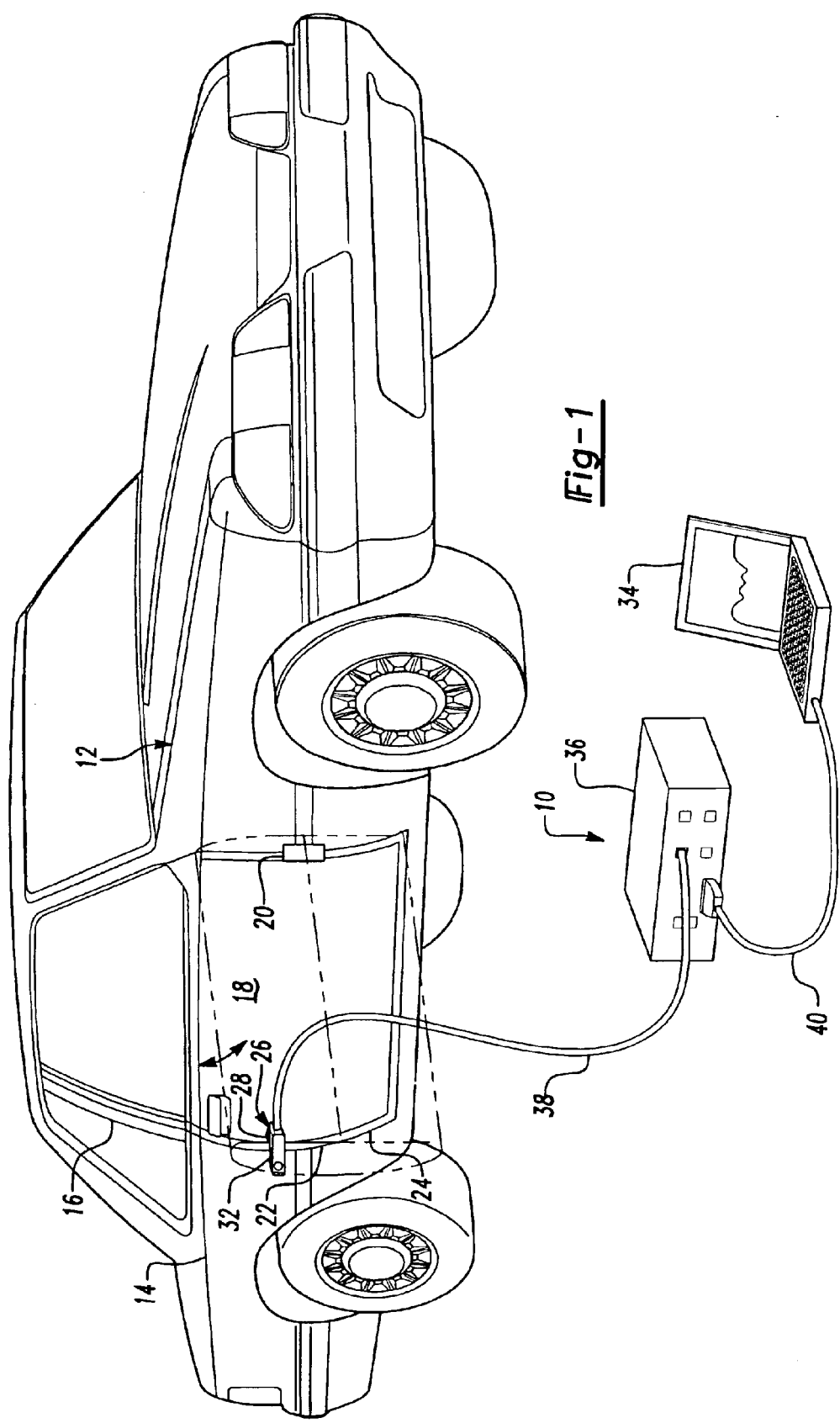
FIG. 1 is a schematic perspective view of the closure measuring system according to the present invention.

Referring to FIG. 1, a closure measuring system is generally shown at 10 for measuring operable specifications of a movable member of a vehicle during operation through a predetermined range of movement. By way of example, an automotive vehicle is generally shown at 12 including a body portion 14 forming a door opening 16 and a door panel 18 pivotally coupled to the body portion 14 by a hinge mechanism 20 for pivotal movement between an open position providing access into the vehicle 12 through the door opening 16 and a closed position covering the door opening 16 and aligned with the body portion 14. More specifically, the door opening 16 is defined by a circumferential peripheral rim portion 22 of the body portion 14. The door panel 18 similarly includes an outer rim portion 24 which is designed to align flush, or in a single plane, with the rim portion 22 and body portion 14 when the door panel 18 is in the closed position. The distance between the rim portion 22 and the rim portion 24 as well as the alignment therebetween is referred to as the door closed flushness specification and has a predetermined design specification or criteria. It should be appreciated that the movable member may include the door panel 18 or may be any movable member attached to the vehicle and movable between one or more positions, i.e., a hood, truck, door handle, latch, sunroof, etc.

Figure 2:
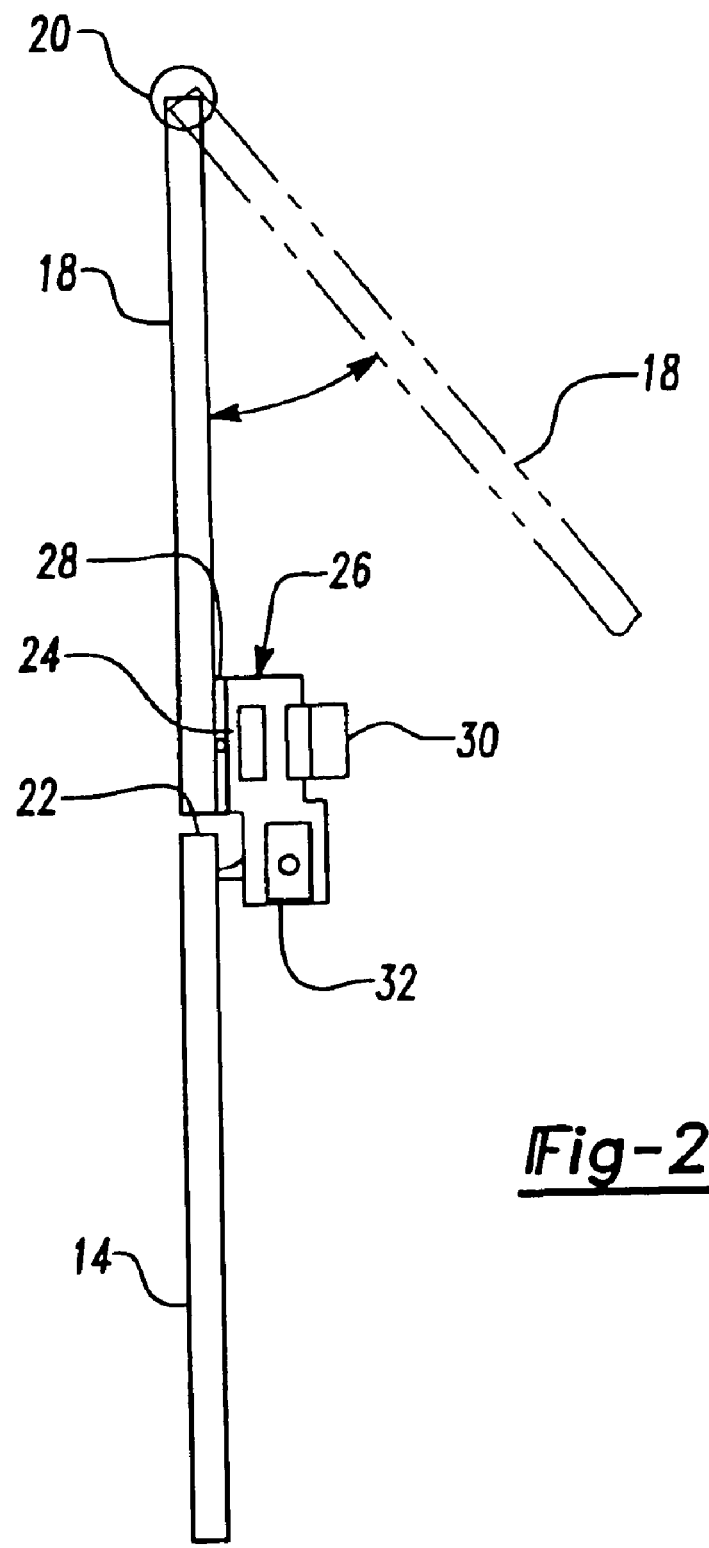
FIG. 2 is a schematic top view of the closure measuring system.

The closure measuring system 10 includes a data sensing device 26 removably attachable to the movable member, or door panel 18, by an attachment member for sensing and measuring at least one of a plurality of operable specifications of the door panel 18. The attachment member removably attaches the data sensing device to the door panel at a predetermined position, immediately adjacent the rim portion 24 of the door panel 18, and maintains the positions while the door panel 18 is moved through a predetermined range of movement, i.e. the open and closed positions. The data sensing device 26 in the preferred embodiment shown in FIGS. 1 and 2 is removably attached to the door panel 18 by a pair of vacuum cups 28. However, it should be appreciated that the data sensing device 26 may be removably attached to the movable member by any suitable attachment member, such as adhesive, magnets, fasteners, or the like.

The operable specifications sensed and measured by the data sensing device 26 include the door closing velocity, the door closed flushness, the door latched position, and the energy or force required to close the door. Specifically, the data sensing device 26 acquires the door velocity throughout full door swing between the open and closed positions, the force input required to swing or pivot the door panel 18 and the door closed position (or flushness). Referring to FIGS. 1 and 2, the data sensing device 26 includes a measuring device such as a gyroscope and loadcell 30 for sensing, measuring and generating electrical signals indicative of the velocity, acceleration and force on the door panel 18 during pivotal movement between the open and closed positions. The data sensing device 26 may also, or alternatively, include an accelerometer for sensing, measuring and calculating the velocity, acceleration and force on the door panel 18.

The data sensing device 26 further includes displacement device such as a laser displacement sensor 32 positioned adjacent the door opening rim portion 22 for sensing, measuring, and generating signals indicative of the distance travelled by the door 18 and the door closed flushness between the door panel 18 and the door opening 16. That is, as the door panel 18 is pivoted between the open and closed positions, the laser displacement sensor 32 senses and measures the distance between the rim portion 24 of the door panel 18 and the rim portion 22 of the door opening 16.

Referring again to FIG. 1, the closure measuring system 10 further includes a control panel 34 for calculating and displaying the sensed and measured operable specifications from the data sensing device 26 and comparing the sensed and measured operable specifications to predetermined design specifications of the door panel 18. That is, the door panel 18, or any movable member, is designed with predetermined design specifications, such as the force require to pivot the door panel 18 between the open and closed position and the door closed flushness. The control panel 24, which is a software control PC, calculates and displays the sensed and measured operable specifications from the data sensing device 26 and compares them to the predetermined design specifications to display such specifications as velocity in engineering units and a pass/fail indicator, door flushness and a pass/fail indicator, closing energy and a pass/fail indicator, and door latched position. The specifications are also downloadable from the control panel 34.

The closure measuring system 10 further includes a data acquisition chassis 36 coupled between the data sensing device 26 and the control panel 34 for storing and transmitting the operable specifications between the data sensing device 26 and the control panel 34. The data acquisition chassis 36 is electrically coupled to the data sensing device 26 by an input line 38 and then electrically coupled to the control panel 34 by an output line 40.

In operation, the control panel 34 is preprogrammed with software to include the predetermined design specification of the movable member, or door panel 18. The design specifications may include door closed flushness, velocity, and energy required to move the door panel 18. The data sensing device 26 is attached to the door panel 18 by the vacuum cups 28 adjacent the rim portion 24 of the door panel 18 such that the laser displacement sensor 32 is aligned with and adjacent the rim portion 22 of the door opening 16 formed by the body portion 14. The data acquisition chassis 36 is electrically connected between the data sensing device 26 and the control panel 34 by the input 38 and output 40 lines and the system 10 in powered on. As the door panel 18 is pivoted about the hinge mechanism 20 between the open and closed position, the data sensing device 26 senses and measures the operable specification including the velocity of the door panel 18, the energy or force require to pivot the door panel 18 and the door closed flushness between the rim portion 24 of the door panel 18 and the rim portion 22 of the door opening 16. These operable specifications are transmitted to the data acquisition chassis 36 and control panel 34 by way of electrical signals for display as well as for comparison with the predetermined design specifications. If the operable and measured specifications are within a predetermined plus/minus range of the design specifications, a pass indicator is displayed on the control panel 34. If not, a fail indicator is displayed and the door panel 18 must be adjusted until within acceptable specifications.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A closure measuring system for measuring operable specifications of a movable member through a predetermined range of movement between an open position and a closed position relative to an automotive vehicle comprising:

a data sensing device adapted to be removably attached to the movable member of the vehicle for sensing and measuring at least one of a plurality of operable specifications of the movable member, said data sensing device including both a measuring device for generating signals indicative of the force applied to the movable member during said predetermined range of movement and a displacement device for generating signals indicative of the distance travelled by the movable member through said predetermined range of movement;

a control panel for calculating and displaying said sensed and measured operable specifications from said data sensing device and comparing said sensed and measured operable specifications to predetermined design specifications of the movable member; and a data acquisition chassis electrically coupled between said data sensing device and said control panel for storing and transmitting said operable specifications between said data sensing device and said control panel; wherein said measuring device includes a gyroscope and loadcell for sensing and measuring the velocity, acceleration and force of the movable member operated through said predetermined range of movement, and said displacement device includes a laser displacement sensor for sensing and measuring the distance travelled by the movable member through said predetermined range of movement and the distance between the movable member and the vehicle.

2. A closure measuring system as set forth in claim 1 further including an attachment member for removably attaching said data sensing device to the movable member at a predetermined position and maintain said position while the movably member is operated through a predetermined range of movement.

3. A closure measuring system for measuring operable specifications of a movable member through a predetermined range of movement between an open position and a closed position relative to an automotive vehicle comprising:

a data sensing device adapted to be removably attached to the movable member of the vehicle for sensing and measuring at least one of a plurality of operable specifications of the movable member, said data sensing device including both a measuring device for generating signals indicative of the force applied to the movable member during said predetermined range of movement and a displacement device for generating signals indicative of the distance travelled by the movable member through said predetermined range of movement;

a control panel for calculating and displaying said sensed and measured operable specifications from said data sensing device and comparing said sensed and measured operable specifications to predetermined design specifications of the movable member; and a data acquisition chassis electrically coupled between said data sensing device and said control panel for storing and transmitting said operable specifications between said data sensing device and said control panel;

wherein said measuring device includes an accelerometer for sensing, measuring, and calculating the velocity, acceleration and force of the movable member operated through said predetermined range of movement, and said displacement device includes a laser displacement sensor for sensing and measuring the distance travelled by the movable member through said predetermined range of movement and the distance between the movable member and the vehicle.

4. A closure measuring system as set forth in claim 2 wherein said attachment member includes at least one vacuum cup mounted to said data sensing device for removably securing said data sensing device to the movable member.

* * * * *